Patented Mar. 19, 1946

2,396,839

UNITED STATES PATENT OFFICE 2,396,839

LUBRICATING COMPOSITION

Elliott Alfred Evans and John Scotchford Elliott, Beaconsfield, England

No Drawing. Application May 12, 1942, Serial No. 442,716. In Great Britain March 25, 1941

12 Claims. (Cl. 252—46.6)

This invention is for improvements in or relating to lubricating compositions, and is particularly concerned with lubricating compositions that are employed in internal combustion engines and that are subjected to high bearing loads and temperatures.

Various different types of addition agents have been suggested for increasing the film-rupture strength of lubricating oils and many of such additives are at present used on a commercial scale with effective result to this end. However, one drawback of most known additives or so-called "extreme-pressure" agents, is that while they increase the film-rupture strength of the oil, they also increase its corrosive effect. On the other hand many additives which function as corrosion inhibitors have no value as extreme-pressure agents. The problem is of particular importance in the lubrication of modern internal-combustion engines employing bearings of the composite metal type such as are employed in aircraft.

It is the object of the present invention to provide a new class of lubricating oil addition agents which are effective to reduce the corrosive action of the oil upon such composite metal bearings and at the same time to increase the film-rupture strength.

According to the present invention, a lubricating composition comprises a lubricating oil base in which there is dispersed a small proportion of an organic compound consisting of an organic ester containing trivalent phosphorus derived from a hydroxy-substituted aromatic compound containing aromatic radicals coupled through sulphur.

In this specification and in the claims the expression "organic ester containing trivalent phosphorus" is restricted to phosphite esters and thiophosphite esters.

In this specification the expression "hydroxy-substituted aromatic compound containing aromatic radicals coupled through sulphur" includes hydroxy-substituted aromatic thioethers, disulphides or polysulphides.

Thus according to the present invention, a lubricating composition comprises a lubricating oil base in which there is dispersed a small proportion of an organic compound consisting of a phosphite or thiophosphite ester derived from an aromatic hydroxy-substituted thioether, disulphide or polysulphide. Such compounds may have one or more atoms of sulphur and one or more atoms (normally one or two) of phosphorus in the molecule and may be represented by the general formula:

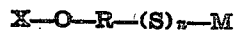

wherein R is an aromatic radical, X is an organic radical containing trivalent phosphorus, M is an aromatic residue and $n$ is a positive integer. More specifically such compounds may be represented by the general formulae:

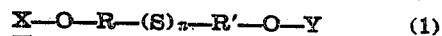 (1)
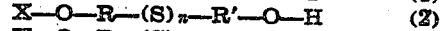 (2)
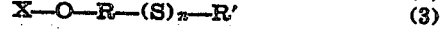 (3)

wherein R and R' are aromatic radicals, X and Y are organic radicals containing trivalent phosphorus, and $n$ is a positive integer, normally 1 to 4. Particularly useful are the additives which contain in the molecule two atoms of trivalent phosphorus and which possess the general formula

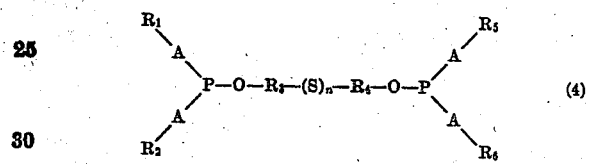 (4)

wherein $R_1$, $R_2$, $R_5$ and $R_6$ are the same or different and are aromatic, aliphatic or cycloaliphatic hydrocarbon radicals which may be unsubstituted or substituted e. g. by alkyl or ester groups or complex groups containing further atoms of sulphur, or by halogen atoms, $R_3$ and $R_4$ are aromatic radicals, preferably the same, which may also be substituted e. g. by alkyl, ester or hydroxyl groups or halogen atoms, and A may be oxygen or sulphur. If desired, $R_1$ and $R_2$ may together form part of a ring structure; the radicals $R_5$ and $R_6$ may together form part of a ring structure. Such compounds may be obtained by reacting an aromatic hydroxy-substituted thioether disulphide or polysulphide with phosphorus trichloride and a phenol, alcohol, thiophenol thioalcohol or with a mixture of such compounds in the requisite proportions. In certain cases suitable materials can be obtained from an aromatic hydroxy-substituted thioether and phosphorus trichloride only; such will have the general formula:

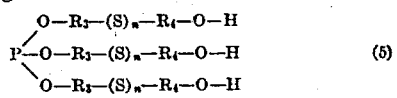

A preferred embodiment of the present invention comprises employing as a lubricating oil addition agent the product resulting from reaction between an aromatic hydroxy-substituted thioether, phosphorus trichloride and a phenol or alcohol, such reaction product having the general formula:

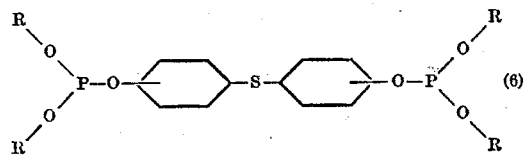

in which the radicals R consist of hydrocarbon groups. The benzene nuclei may carry further substituents; a preferred substituent is the carbomethoxy group present in both nuclei and resulting from the employment of di-(3-carbomethoxy-4-hydroxyphenyl)-thioether in the aforesaid reaction. For the radicals R it is at present preferred to employ the higher aliphatic (e. g. butyl and higher aliphatic groups) and aromatic groups. Specific examples of the radicals are n-butyl, amyl, 2-ethyl hexyl, oleyl, phenyl, o-m- and p-cresyl, tertiary butyl cresyl and halogenated phenyl groups.

In place of di-3-carbomethoxy-4-hydroxyphenyl thioether may be employed other thioethers e. g. pp'-di-hydroxy-diphenyl thioether, di(2-methyl-4-hydroxyphenyl) thioether, di(2:4-dihydroxyphenyl) thioether and the thioethers derived from p-tertiary butyl phenol and p-tertiary amyl phenol.

Methods for the preparation of lubricating oil addition agents of the present invention will readily suggest themselves to one versed in the art. However, the following examples are given by way of illustration:

(A) COMPOUNDS OF GENERAL FORMULA (1)

EXAMPLE I 221 grams of phosphorus trichloride were dissolved in 500 cc. of dry carbon tetrachloride, and 350 grams of "cresylic acid" (mixed o-m- and p-cresols) were added. The mixture was refluxed gently in a large flask until no more hydrogen chloride was evolved (about 2 hours).

To the cooled mixture was then added a solution of 269 grams of di(3-carbomethoxy-4-hydroxyphenyl) thioether in 300 cc. of carbon tetrachloride, 190 grams (50% excess) of dry pyridine were then added, and the mixture refluxed for a further 15 minutes.

After standing overnight, the solution was decanted from the crystalline pyridine hydrochloride, filtered through muslin, and subjected to distillation in vacuo to remove carbon tetrachloride and excess pyridine. The residue was finally heated to 110° C. in vacuo. By this method 650 grams (97 per cent) of a viscous red-yellow liquid were obtained.

The two reactions which take place may be represented as follows:

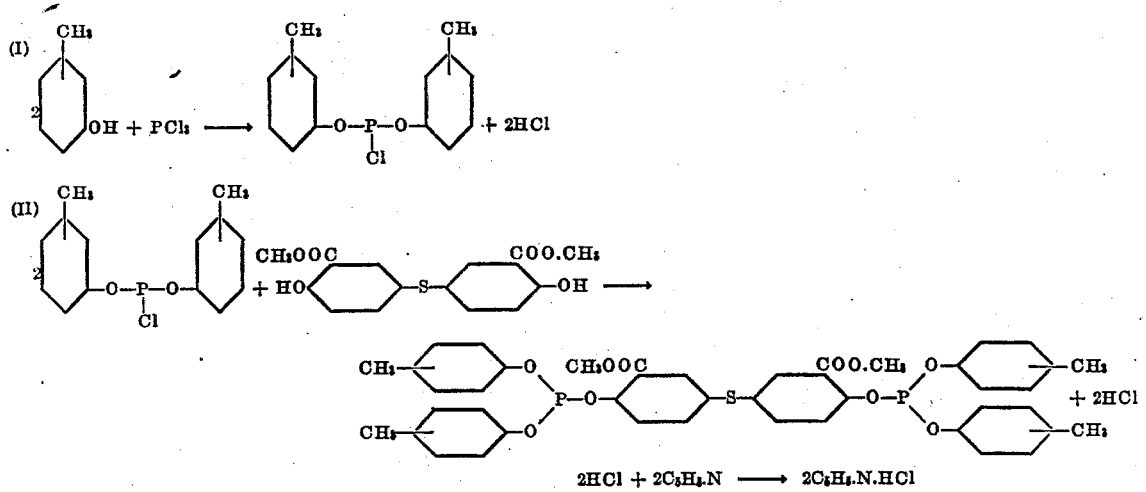

The second reaction only takes place on heating in the presence of pyridine or other acid binding agent. Certain other thioethers, however, can be induced to react in the absence of such a basic material. It will readily be seen that such reactions may give rise to minor amounts of products other than those of the type specified in the foregoing formulae. Thus, in the first part of the reaction a small amount of tricresyl phosphite will invariably be formed and a corresponding quantity of monocresyl phosphorus dichloride, which in the second part of the reaction, will give rise to polymers of varying length by reaction with the thioether. Similar polymers are produced in bulk when 2 or 3 mols. of the thioether are acted upon by 1 mol. of phosphorus trichloride, such a product having a very limited oil-solubility. When, however, they are found in minor amounts mixed with the compounds of this invention, their presence is not objectionable.

EXAMPLE II 7.4 grams of butyl alcohol mixed with 8.5 cc. of pyridine were added gradually to a solution of 6.85 grams of phosphorus trichloride dissolved in 25 cc. benzene, and to this mixture was added a solution of 8.35 grams of di(3-carbomethoxy-4-hydroxyphenyl) thioether and 5 grams of pyridine in 30 cc. of benzene. After refluxing for 15 minutes the cooled solution was filtered from pyridine hydrochloride and the distillation effected as in the previous example.

By this method were obtained 14.5 grams (84 per cent) of a pale yellow liquid, less viscous than the product of Example I.

The equations are as follows:

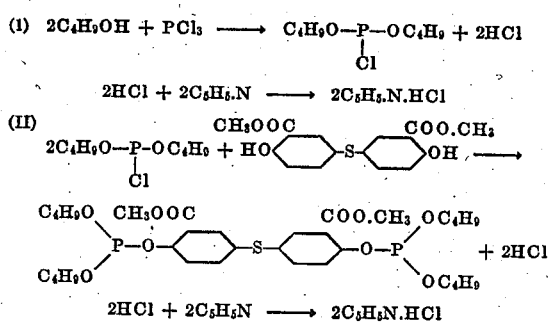

Example III 6.2 grams of thio-p-cresol were added to a solution of 3.44 grams of phosphorus trichloride in 30 cc. of benzene and the mixture refluxed until no more hydrogen chloride was evolved.

2.73 grams of pp'-dihydroxydiphenyl thioether and 3 grams of pyridine were then added and the mixture refluxed a further 15 minutes. The material was then worked up as in the two previous examples. The product was an almost white solid of low melting point.

The equations are as follows:

The equations are as follows:

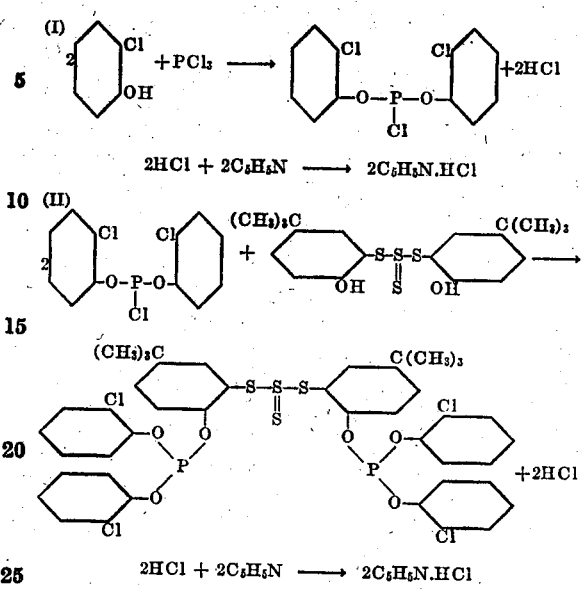

The foregoing are illustrative of the methods of preparation available, but are in no wise limitative.

The structural formulae assigned to the compounds claimed herein are confirmed by analysis, as the following examples show. (The method employed was Eschka's method):

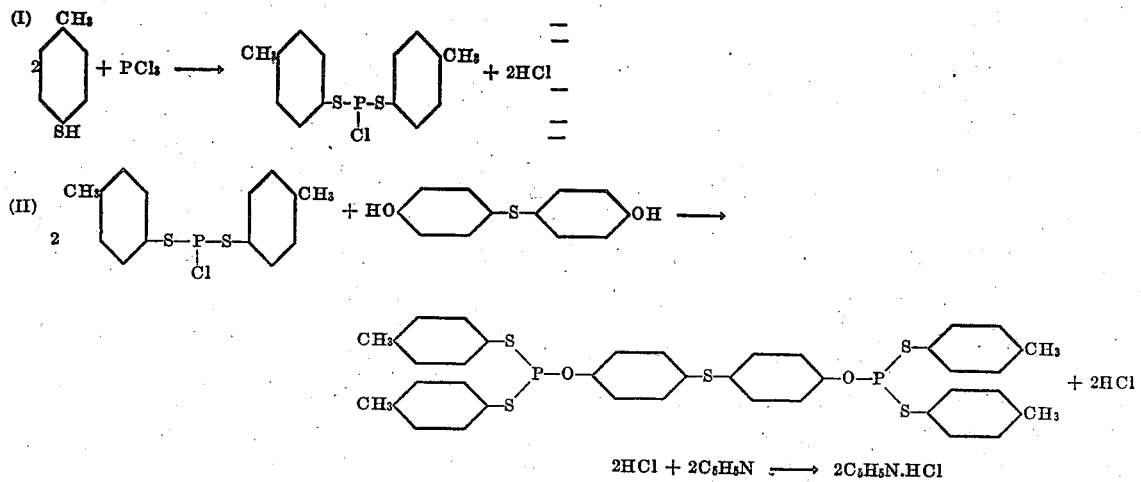

Example IV

To a solution of 3 grams of phosphorus trichloride in 30 cc. of benzene were added 5.6 grams of o-chlorophenol and 5 grams of pyridine. The mixture was refluxed for 10 minutes to induce reaction.

4.64 grams of p-tertiary butyl phenol tetrasulphide were then added and 2.5 grams of pyridine, and the mixture refluxed for a futher 10 minutes.

The product was cooled, filtered and distilled as before. By this method was obtained a hard yellow transparent resin which was, however, soluble in mineral lubricating oil.

Compound of general formula (4)

| Derived from— | Where $R_1=R_2=R_3=R_4$ and $R_1A$ is— | Percentage of phosphorus | |
|---|---|---|---|
| | | Found | Calculated |
| Di(3-carbomethoxy-4-hydroxyphenyl) thioether. | Phenyl | 8.19 | 8.10 |
| Do | o-Cresyl | 7.89 | 7.54 |
| Do | Tertiary butyl cresyl. | 5.88 | 5.93 |
| Do | Butyl | 8.64 | 9.04 |
| pp'Dihydroxydiphenyl thioether. | p-Cresylthio | 7.90 | 7.97 |
| Di(3-tertiary amyl-6 hydroxyphenyl) disulphide. | Cyclohexyl | 7.17 | 7.19 |

(B) COMPOUNDS OF GENERAL FORMULA (2)

These compounds are prepared similarly but by employing double the quantity of the thioether required for the corresponding compound of general formula (1).

EXAMPLE V 5.4 grams of "cresylic acid" were added to a solution of 3.43 grams of phosphorus trichloride in 30 cc. of benzene and refluxed until no more hydrogen chloride was evolved.

A solution of 8.35 grams of di(3-carbomethoxy-4-hydroxyphenyl) thioether in 20 cc. benzene containing 3.5 grams of pyridine was then added and the mixture refluxed for a further 15 minutes.

By this method there were obtained 12.8 grams (88 per cent) of a yellow semi-solid mass.

Percentage of phosphorus:

|  | Per cent |
| --- | --- |
| Found | 5.42 |
| Calculated | 5.36 |

The equations are as follows:

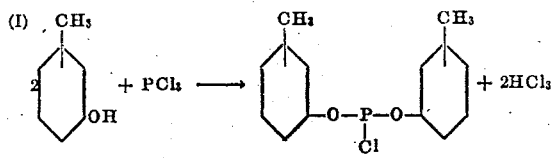

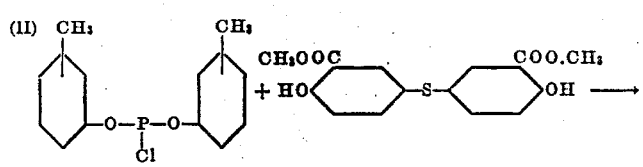

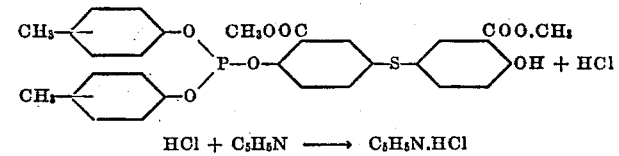

$HCl + C_5H_5N \longrightarrow C_5H_5N.HCl$

It will be observed that products prepared according to the foregoing two examples will not consist wholly of the compounds of general formula (2) but will also contain a certain amount of the corresponding compound of general formula (1) and an equivalent amount of unreacted thioether. This last may be removed, at least in part, but it has not generally been found necessary to do so.

It should be noted that although thioethers such as di(3-carbomethoxy-4-hydroxyphenol) thioether will give satisfactory compounds of formula (5) the corresponding compounds of general type (1) containing two atoms of phosphorus per molecule cannot be formed. Instead, long-chain polymers having a very low oil-solubility are produced.

(C) COMPOUNDS OF GENERAL FORMULA (3)

These compounds can be obtained from un-

EXAMPLE VI 8.35 grams of di-3-carbomethoxy-4-hydroxyphenyl thioether were dissolved in 30 cc. hot carbon tetrachloride containing 2.5 grams of pyridine, and a solution of 1.15 grams of phosphorus trichloride in 10 cc. carbon tetrachloride were added. After refluxing for 15 minutes the product was worked up in the usual manner.

There were obtained 7.6 grams of a hard opaque yellow solid.

Percentage of phosphorus:

|  | Per cent |
| --- | --- |
| Found | 2.38 |
| Calculated | 3.01 |

The equation is as follows:

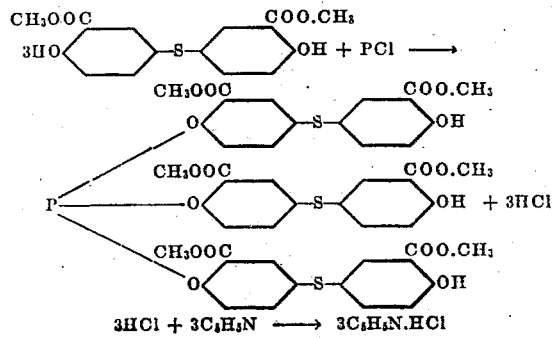

$3HCl + 3C_5H_5N \longrightarrow 3C_5H_5N.HCl$ symmetrical thioethers such as phenyl p-hydroxyphenyl thioether by reactions similar to those already outlined.

The addition agents of the present invention are particularly effective for improving the properties of a lubricating oil (for example, a paraffinic mineral oil). These compounds, particularly those of general formula (6) in which the radicals R are aromatic radicals, are particularly valuable in that they are readily oil soluble, have a high decomposition point and possess the property of imparting a fairly high film-rupture strength to the oil in which they are dissolved. Thus, 0.3 to 0.5% of many of these compounds will impart to a mineral oil a film-rupture strength of 8,000 to 11,000 pounds per square inch or even higher when tested on the well-known Almen type of testing machine.

In other cases it may be desirable to employ more than 0.5%. The following examples illustrate the effectiveness of these compounds:

In these tests the compounds were dissolved in a paraffinic mineral oil of the distilled bright stock type, having itself a film rupture strength of 4,000 pounds per square inch.

| Compound derived from— | Where $R_1=R_2=R_3=R_4$ and $R_1A$ is— | Percentage | Film-rupture strength, lbs/sq. in. |
|---|---|---|---|
| 1. General formula (4): | | Percent | |
| Di(3-carbomethoxy-4-hydroxyphenyl) thioether | Phenyl | 0.3 | 8,000 |
| Do | Mixed cresols | 0.3 | 10,000 |
| Do | Butyl | 0.3 | 9,000 |
| pp'Dihydroxydiphenyl thioether | Phenyl | 1.0 | >15,000 |
| Di(3-tertiary amyl-6-hydroxy-phenyl) disulphide | 2-ethyl hexyl | 1.0 | 14,000 |
| 2. General formula (5): | | | |
| Di(3-carbomethoxy-4-hydroxy-phenyl) thioether | | 0.5 | >15,000 |

In addition, these compounds are inhibitors of corrosion and are therefore particularly suited for inhibiting the corrosion of composite metal bearings as is shown by the following tests.

tioned first, and the radical $R_1A$ (assuming $R_1=R_2=R_3=R_4$) following. Thus a compound of type (4) in which $R_1A$=phenyl and the thioether concerned is pp'dihydroxydiphenyl thioether, would be designated as pp'dihydroxydiphenyl thioether phenyl phosphite.

| Oil under test | Weight loss of bearing after— | | | | | | |
|---|---|---|---|---|---|---|---|
| | 50 hrs. | 75 hrs. | 100 hrs. | 125 hrs. | 150 hrs. | 200 hrs. | |
| | Mg. | Mg. | Mg. | Mg. | Mg. | Mg. | |
| Oil uninhibited | 5 | 26 | 120 | | | | Solid at 160° C. |
| A+0.1% di(3-carbomethoxy-4-hydroxyphenyl) thioether butyl phosphite. | Nil | Nil | Nil | Nil | 1 | 2 | Oil fluid. |
| +0.1% di(3-carbomethoxy-4-hydroxyphenyl) thioether phenyl phosphite. | Nil | Nil | 1 | 1 | | | Do. |
| +0.1% di(3-carbomethoxy-4-hydroxyphenyl) thioether o-cresyl phosphite. | Nil | Nil | Nil | Nil | 1 | 4 | Do. |
| +0.1% di(3-carbomethoxy-4-hydroxyphenyl) thioether tertiary butyl cresyl phosphite. | Nil | Nil | Nil | Nil | | | Do. |
| +0.1% di(3-carbomethoxy-4-hydroxyphenyl) thioether salicyl phosphite. | Nil | 4 | 18 | | | | Solid at 160° C. |
| +0.1% pp'dihydroxydiphenyl thioether phenyl phosphite | Nil | 1 | 2 | 8 | 45 | | Oil fluid. |
| +0.1% pp'dihydroxydiphenyl thioether oleyl phosphite | Nil | 1 | 17 | | | | Solid at 160° C. |
| +0.1% pp'dihydroxydiphenyl thioether p-cresyl thio phosphite | Nil | 1 | 1 | 2 | 2 | | Oil fluid. |
| +0.1% di(3-tertiary amyl-6-hydroxyphenyl) disulphide cyclohexyl phosphite. | Nil | 1 | 6 | 100 | | | Oil solid at 160° C. |
| +0.1% di(3-tertiary amyl-6-hydroxyphenyl) disulphide 2-ethyl hexyl phosphite. | Nil | 1 | 4 | 11 | | | Solid (130 hours at 160° C.). |
| +0.1% di(3-tertiary butyl-6-hydroxyphenyl) tetrasulphide o-chlorophenyl phosphite. | Nil | Nil | Nil | Nil | 1 | | Oil fluid. |
| +0.1% di(3-carbomethoxy-4-hydroxyphenyl) thioether cresyl (mixed) phosphite of general formula (2). | Nil | Nil | Nil | Nil | 3 | | Do. |
| +0.1% di(3-carbomethoxy-4-hydroxyphenyl) thioether phosphite of general formula (5). | 1 | 3 | 5 | 15 | 25 | | Oil solid at 160° C. |

In these corrosion tests segments ½" wide cut from a cylindrical cadmium-nickel bearing of 7 cm. internal diameter, each segment being equal in length to one quarter of the circumference of the bearing, were affixed to the ends of vertical rods rotated at a speed of approximately 680 R. P. M. The rods were so adjusted that the segments were just immersed in the oil under test, 310 grams of which were contained in tall beakers of 1500 cc. capacity, heated to 160° C. in an oil bath. The surface of the oil made a tangent to the arc of the circle of which the bearing was a segment. The oil bath was adapted to contain four such beakers so that four oils could be tested simultaneously. At the bottom of each beaker was placed a piece of sheet copper 3" x 1¼" x $\frac{1}{32}$".

The bearings were detached and weighed and examined at intervals during the test, the loss in weight after certain specified time intervals being determined, graphically where necessary. The condition of the oils at the conclusion of the test was also noted visually.

In these tests a solvent refined mineral oil was employed (oil A) 0.1 per cent of the various phosphites being added in each case.

For simplicity in naming these phosphites they are assumed to be of general type (4) unless otherwise stated, the thioether or polysulphide from which they are derived being mentioned first, and the radical $R_1A$ (assuming $R_1=R_2=R_3=R_4$) following.

From the above results it will be observed that the addition agents of the present invention are particularly good corrosion inhibitors even at such low concentrations as 0.1 per cent.

It has also been found that the addition agents of the present invention do not increase the oxidation of a mineral oil under the conditions of the well-known oxidation test.

Furthermore the compounds of this invention have a marked capacity for reducing oxidation under the conditions of the iron oxidation test.

In this test six-gram samples of the oil under test are mixed with 0.1 gram of fine iron filings in petridishes and heated for a specified time in an oven at 180° C. After the oxidation the comparative viscosities are measured by means of a standard microviscometer, the percentages of matter insoluble in petroleum ether (B. P. below 40° C.) determined on weighed quantities of the oil (2–3 grams) in the normal way, and the acidities compared by adding neutral alcohol to the filtrates from the latter determination and titrating with standard alkali using phenolphthalein as indicator.

The following results clearly show the oxidation inhibiting properties of the compounds of this invention.

TEST NO. 1

In this test oil A was employed, as in the corrosion tests, already described. The oils were heated at 180° C. for 9 hours.

| Oil under test | Comparative viscosity (70° F.) | Percentage insol. in pet. ether (B. P. <40° C.) | Acidity (mgs. KOH /per 100 gm. oil) |
|---|---|---|---|
| Oil A uninhibited | 4′ 48″ | Per cent 0.07 | 290 |
| +0.3% di(3-carbomethoxy-4-hydroxyphenyl) thio-ether phenyl phosphite | 3′ 20″ | 0.08 | 133 |
| +0.3% di(3-carbomethoxy-4-hydroxyphenyl) thio-ether butyl phosphite | 3′ 17″ | Nil | 122 |
| +0.3% di(3-carbomethoxy-4-hydroxyphenyl) thio-ether tertiary butyl cresyl phosphite | 3′ 17″ | Nil | 120 |

TEST No. 2

In this test oil B, a blend of a poor quality green cylinder oil with a naphthenic base oil of the 500 Red type, was employed. The test was of 6 hours duration.

| Oil under test | Comparative viscosity (70° F.) | Percentage insol. in pet. ether (B. P. <40° C.) | Acidity (mgs. KOH /per 100 gm. oil) |
|---|---|---|---|
| Oil B uninhibited | 5′ 13″ | Per cent 3.20 | 143 |
| +0.3% di(3-carbomethoxy-4-hydroxyphenyl) thio-ether o-cresyl phosphite | 4′ 28″ | 2.22 | 120 |
| +0.3% pp'dihydroxydiphenyl thioether p-cresyl-thio phosphite | 4′ 47″ | 2.42 | 129 |
| +0.3% di(3-tertiary amyl-6-hydroxyphenyl) disulphide cyclohexyl phosphite | 4′ 56″ | 2.81 | 115 |

TEST No. 3

In this test oil B, was again employed, the test being of 6 hours duration.

| Oil under test | Comparative viscosity (70° F.) | Percentage insol. in pet. ether (B. P. <40° C.) | Acidity (mgs. KOH /per 100 gm. oil) |
|---|---|---|---|
| Oil B uninhibited | 5′ 29″ | Per cent 3.62 | 165 |
| +0.3% pp'dihydroxydiphenyl thioether oleyl phosphite | 4′ 31″ | 2.73 | 145 |
| +0.3% di(2-methyl-4-hydroxyphenyl) thioether amyl phosphite | 4′ 32″ | 2.42 | 141 |
| +0.3% di(3-carbomethoxy-4-hydroxyphenyl) thioether cresyl (mixed) phosphite of general formula (2) | 4′ 27″ | 2.15 | 144 |
| +0.3% di(3-carbomethoxy-4-hydroxyphenyl) thioether phosphite of general formula (5) | 4′ 34″ | 2.56 | 186 |

Again, the addition agents of this invention tend to reduce the carbon deposit in an internal-combustion engine as the following test results demonstrates. In this test, 0.5% of the product of Example I was dissolved in a mineral oil and tested for 12 hours in a motor cycle engine; a blank test was also performed; the results were as follows:

| Oil | Total carbon deposit | Piston ring loss |
|---|---|---|
| Plain mineral oil | Grams 3.20 | Milligrams 33 |
| Same oil+0.5% of product of Example I | 2.85 | 22 |

Advantage may accrue from the employment, in conjunction with the addition agents of the present invention, of substances, for example certain esters, known to increase the oiliness of the composition.

In the formulae set out above, where the bond line is shown extended into the benzene ring the indication is that the substituent in question may be attached at that point or at any other available point in the ring.

We claim:

1. The method of making a lubricating composition which comprises reacting an aromatic hydroxy-ester containing aromatic radicals coupled through sulphur with an organic di-substituted phosphorus chloride compound to produce an oil-soluble phosphite ester effective to increase the film-rupture strength of a lubricating oil base in which it is dispersed.

2. The method of making a lubricating composition which comprises reacting an aromatic hydroxy-ester containing aromatic radicals coupled through sulphur with an organic di-substituted phosphorus chloride compound in the presence of an acid-binding agent to produce an oil-soluble phosphite ester effective to increase the film-rupture strength of a lubricating oil base in which it is dispersed.

3. The method of making a lubricating composition which comprises reacting an aromatic hydroxy-ester containing aromatic radicals coupled through sulphur with an organic di-substituted phosphorus chloride compound in the presence of pyridine to produce an oil-soluble phosphite ester effective to increase the film-rupture strength of a lubricating oil base in which it is dispersed.

4. The method of making a lubricating composition which comprises reacting an aromatic hydroxy-ester of the general formula

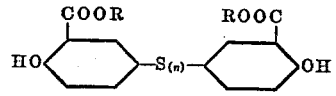

with a compound represented by the formula $(R_1-A)_2P-Cl$ in which the radicals R are selected from the group consisting of alkyl, aryl, aralkyl and cycloalkyl groups, the radicals $R_1$ consist of hydrocarbon groups, and A is selected from the group consisting of oxygen and sulphur, thereby forming an oil-soluble compound effective to increase the film-rupture strength of a lubricating oil base in which it is dispersed.

5. The method of making a lubricating composition which comprises reacting in the presence of an acid-binding agent an aromatic hydroxy-ester of the general formula

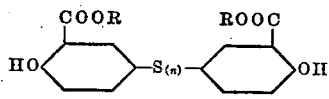

with a compound represented by the formula $(R_1-A)_2P-Cl$ in which the radicals R are selected from the group consisting of alkyl, aryl, aralkyl and cycloalkyl groups, the radicals $R_1$ consist of hydrocarbon groups, and A is selected from the group consisting of oxygen and sulphur, thereby forming an oil-soluble compound effective to increase the film-rupture strength of a lubricating oil base in which it is dispersed.

6. The method of making a lubricating composition which comprises reacting in the presence of pyridine an aromatic hydroxy-ester of the general formula

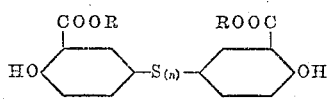

with a compound represented by the formula $(R_1—A)_2P—Cl$ in which the radicals R are selected from the group consisting of alkyl, aryl, aralkyl and cycloalkyl groups, the radicals $R_1$ consist of hydrocarbon groups, and A is selected from the group consisting of oxygen and sulphur, thereby forming an oil-soluble compound effective to increase the film-rupture strength of a lubricating oil base in which it is dispersed.

7. The method of making a lubricating composition which comprises reacting an aromatic hydroxy-ester of the general formula

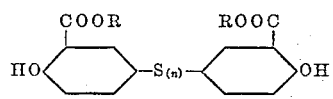

with a compound represented by the formula $(R_1—O)_2P—Cl$ in which the radicals R are selected from the group consisting of alkyl, aryl, aralkyl and cycloalkyl groups, and the radicals $R_1$ consist of hydrocarbon groups, thereby forming an oil-soluble compound effective to increase the film-rupture strength of a lubricating oil base in which it is dispersed.

8. The method as claimed in claim 4 wherein the integer $n$ equals 1.

9. The method of making a lubricating composition which comprises reacting di-(3-carbomethoxy-4-hydroxyphenyl)-thioether with dicresyl phosphorus chloride to produce an oil-soluble phosphite ester effective to increase the film-rupture strength of a lubricating oil base in which it is dispersed.

10. The method of making a lubricating composition which comprises reacting equimolecular quantities of di-(3-carbomethoxy-4-hydroxyphenyl)-thioether with dicresyl phosphorus chloride to produce an oil-soluble phosphite ester effective to increase the film-rupture strength of a lubricating oil base in which it is dispersed.

11. The method as claimed in claim 10 wherein the reaction is conducted in the presence of an acid binding agent.

12. The method as claimed in claim 10 wherein the reaction is conducted in the presence of an acid binding agent.

ELLIOTT ALFRED EVANS.
JOHN SCOTCHFORD ELLIOTT.